Nov. 4, 1952 G. H. LEONARD 2,616,703

PHONOGRAPH RECORD CHANGER

Filed Oct. 14, 1947 5 Sheets-Sheet 1

INVENTOR.
George Hamlin Leonard
BY
Johnson and Kline
ATTORNEYS

PHONOGRAPH RECORD CHANGER

Filed Oct. 14, 1947 5 Sheets-Sheet 2

INVENTOR.
George Hamlin Leonard
BY
Johnson and Kline
ATTORNEYS

PHONOGRAPH RECORD CHANGER

Filed Oct. 14, 1947 5 Sheets-Sheet 3

INVENTOR.
George Hamlin Leonard

BY Johnson and Kline

ATTORNEYS

INVENTOR.
George Hamlin Leonard
BY Johnson and Kline
ATTORNEYS

Nov. 4, 1952

G. H. LEONARD 2,616,703

PHONOGRAPH RECORD CHANGER

Filed Oct. 14, 1947

5 Sheets-Sheet 5

INVENTOR.
George Hamlin Leonard
BY
Johnson and Kline
ATTORNEYS

Patented Nov. 4, 1952

2,616,703

UNITED STATES PATENT OFFICE 2,616,703

PHONOGRAPH RECORD CHANGER

George Hamlin Leonard, Darien, Conn., assignor to Arthur A. Johnson, Bridgeport, Conn., as trustee Application October 14, 1947, Serial No. 779,735

7 Claims. (Cl. 274—1)

This invention relates to automatic record-changer-and-player units for phonographs, such units being commonly termed "record changers."

The invention concerns improvements in the record changer described and claimed in my prior copending patent application, Serial No. 702,905, filed October 12, 1946.

The record changer of this prior patent application is of the type wherein a stack of records is supported above the turntable of the phonograph solely by means carried by a spindle projecting above the turntable, said means including arms extendable from and retractable within the spindle.

In my prior record changer, the record-supporting arms of the spindle were left in extended position at the end of a playing period and had to be first retracted by manually operable means in order to remove the played-through record or stack of records from the spindle.

An object of the present invention is to provide means, in a record changer of the above type, whereby the record-supporting arms of the spindle are automatically retracted to position within the spindle at the termination of a playing period, thereby making unnecessary the extra, manual operation heretofore required in order to remove the played-through record or stack of records from the spindle.

In my prior record changer it was possible for a person, by actuating at an improper time the said manually operable means for retracting the record-supporting arms, to suddenly let fall on the turntable a full stack of records supported by the arms above the turntable, causing inconvenience and requiring repositioning of the stack.

Another object of the present invention is to provide an improved record changer of the type mentioned, wherein manually operable means for dropping or retracting the record-supporting arms are omitted and are not necessary, so that it is impossible to drop, all at once, a stack of records from the arms to the turntable.

A further object of the present invention is to provide a record changer of the above type, having manually operable means for dropping or retracting the record-supporting arms, the said means being so organized and arranged however that a stack of records supported on the arms cannot be dropped all at once to the turntable.

In the record changer of my prior application, due to the provision of a uni-directional clutch drive in the trip mechanism by which a change or shut-off cycle was initiated, if the turntable during adjustment or repair were to be inadvertently manually turned in a reverse direction when the parts of the changer were part way through a change cycle, there was a likelihood of the trip mechanism becoming damaged and being rendered inoperative.

A further object of this invention is to provide an improved trip mechanism for a record changer of the above type, which mechanism is so organized that regardless of whether or not the parts of the record changer are in or part way through a change cycle, the turntable may be manually turned in either direction without causing damage to or inoperativeness of the parts.

In my prior record changer the trip mechanism by which a change or shut-off cycle was automatically initiated responded to movement of the tone arm which was the reverse from the playing movement, such reverse movement being effected by an eccentric groove at the center of the record. Where a record did not have an eccentric groove, but instead had a plain spiral groove of large pitch (which is also common), the trip mechanism would not be operated, and therefore such records could not be included in a stack and automatically changed.

A still further object of the present invention is to provide, for a record changer of the type mentioned, an improved trip mechanism which is operated by records having either an eccentric groove or a plain spiral groove, thereby enabling either type of record to be used in a stack which is to be played through automatically. This is accomplished by a novel velocity-responsive organization which is actuated when the speed of forward or inward movement of the tone arm is increased by virtue of the tone arm leaving the small-pitch playing grooves of a record and entering either the eccentric groove or the large-pitch spiral groove thereof, whichever the record is provided with.

A feature of the improved trip mechanism of the present invention is the elimination of critical adjustments.

A further feature of the improved trip mechanism of this invention is its sensitivity and reliable response even though the needle pressure on the record is extremely light.

In my prior record changer a spring-charged feeler was provided, which was engaged and actuated by the edge of a 12" record when the latter dropped from the supporting arms of the spindle to the turntable. During such action the record would be tilted out of the horizontal and would not have a free uninterrupted fall so as to strike flat against the turntable.

Another object of the present invention is to provide improved feeler means for a record changer of the above type, which means requires only an extremely small force to actuate it, and which means is so organized that it does not tilt or deflect the record engaging it, nor interfere with the free fall of the record from the supporting arms to the turntable.

A feature of the said improved feeler means of the invention resides in the organization whereby relatively great variations in the diameter of 12'' records are permissible without adversely affecting the intended operation of said means nor the control of the tone-arm thereby.

Still other objects of the invention are to generally improve the structure, operation and ease of fabrication of my prior, above-referred-to record changer, and to reduce the noise thereof and the effects of wear.

Other features and advantages will hereinafter appear.

The structure and operation of the improved record changer of this invention is in many respects similar to that of the record changer described in detail in my prior copending application above referred to, and accordingly in this application detailed description will be limited to those parts or combinations of parts and functions which are new over the prior disclosure; where a general description only of parts and functions is given herein, reference may be had to the prior copending application for a more complete understanding.

Figures 1, 20:
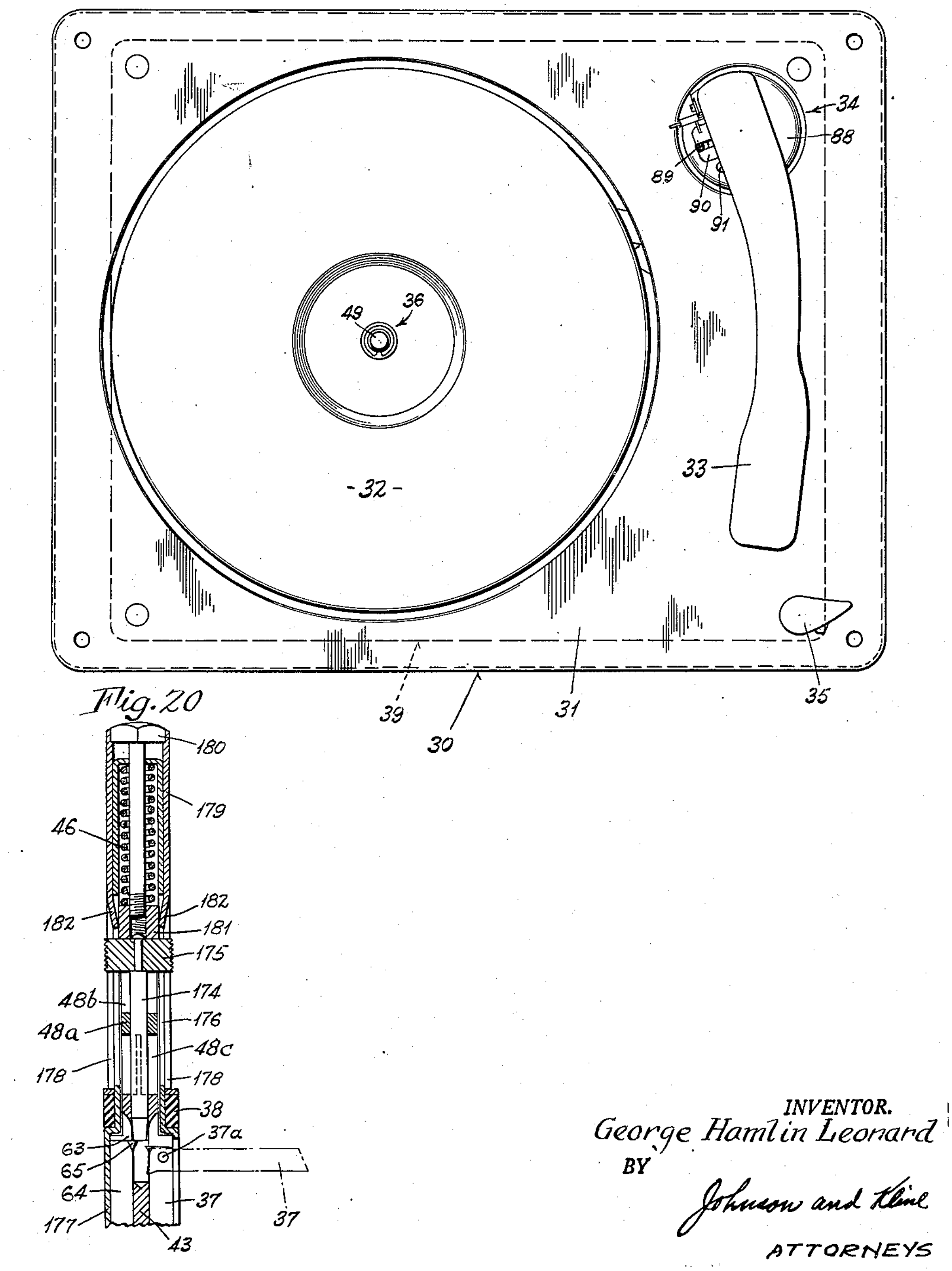
Figure 1 is a top or plan view of the improved record changer of this invention.
Fig. 20 is a fragmentary vertical axial sectional view of a main or record-supporting spindle illustrating a modification of the invention.

Referring to Fig. 1, the present improved record changer may comprise a frame 30 on which is mounted a top or cover panel 31, and above which latter are disposed a turntable 32, tone-arm 33 for traversing the turntable, and an arm supporting post or tower 34. At one corner of the panel 31 a manually operable member in the form of a pivotally movable starter button or knob 35 is provided. Through the turntable 32 a stationary spindle 36 projects upwardly, the said spindle being the sole means of support of a stack of records to be played through, and having intermediate its ends a plurality of pivoted record-support projections or arms 37, Figs. 2, 4, 5 and 6, which are nestable in the spindle, the spindle also having an expandable record-gripping collar 38.

Figure 7:
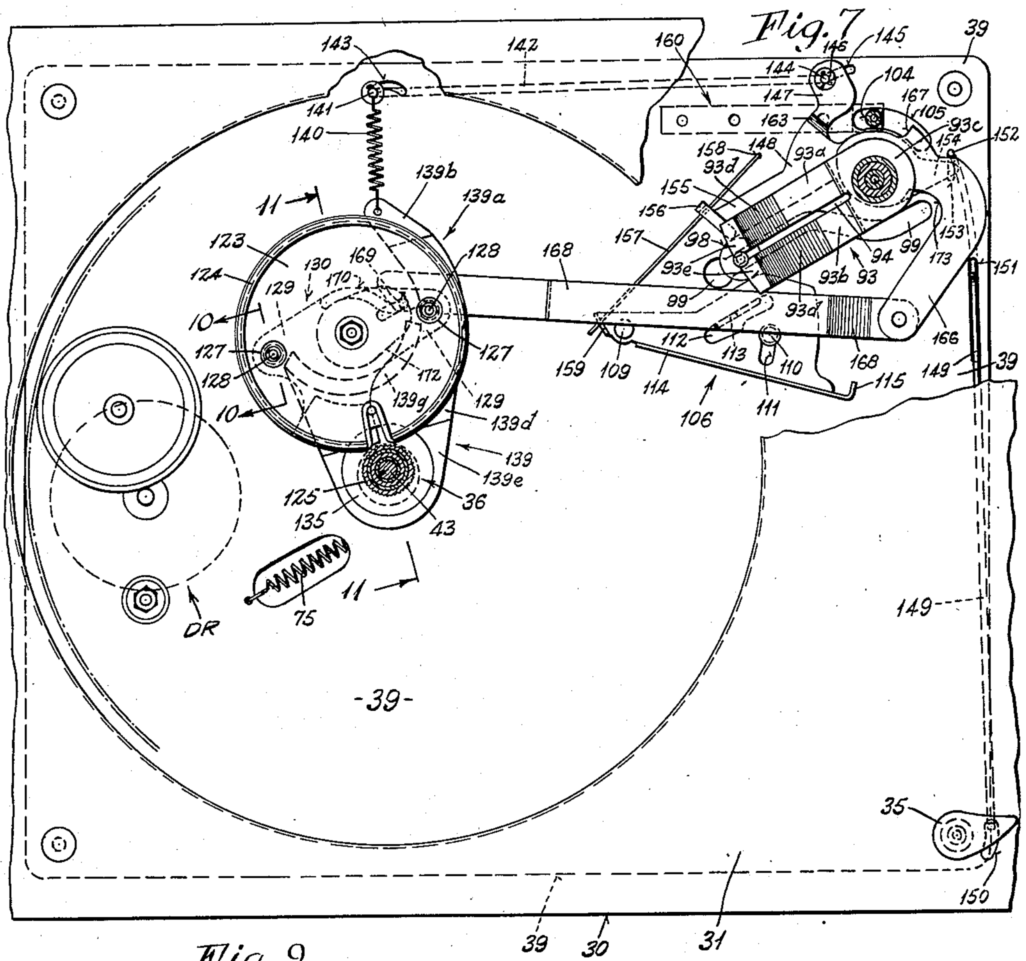
Fig. 7 is a plan view of the parts of the record changer located below the turntable and tone-arm, a portion of the top or cover panel for the parts being broken away to reveal the parts.
Figures 11, 12, 13, 14, 15:
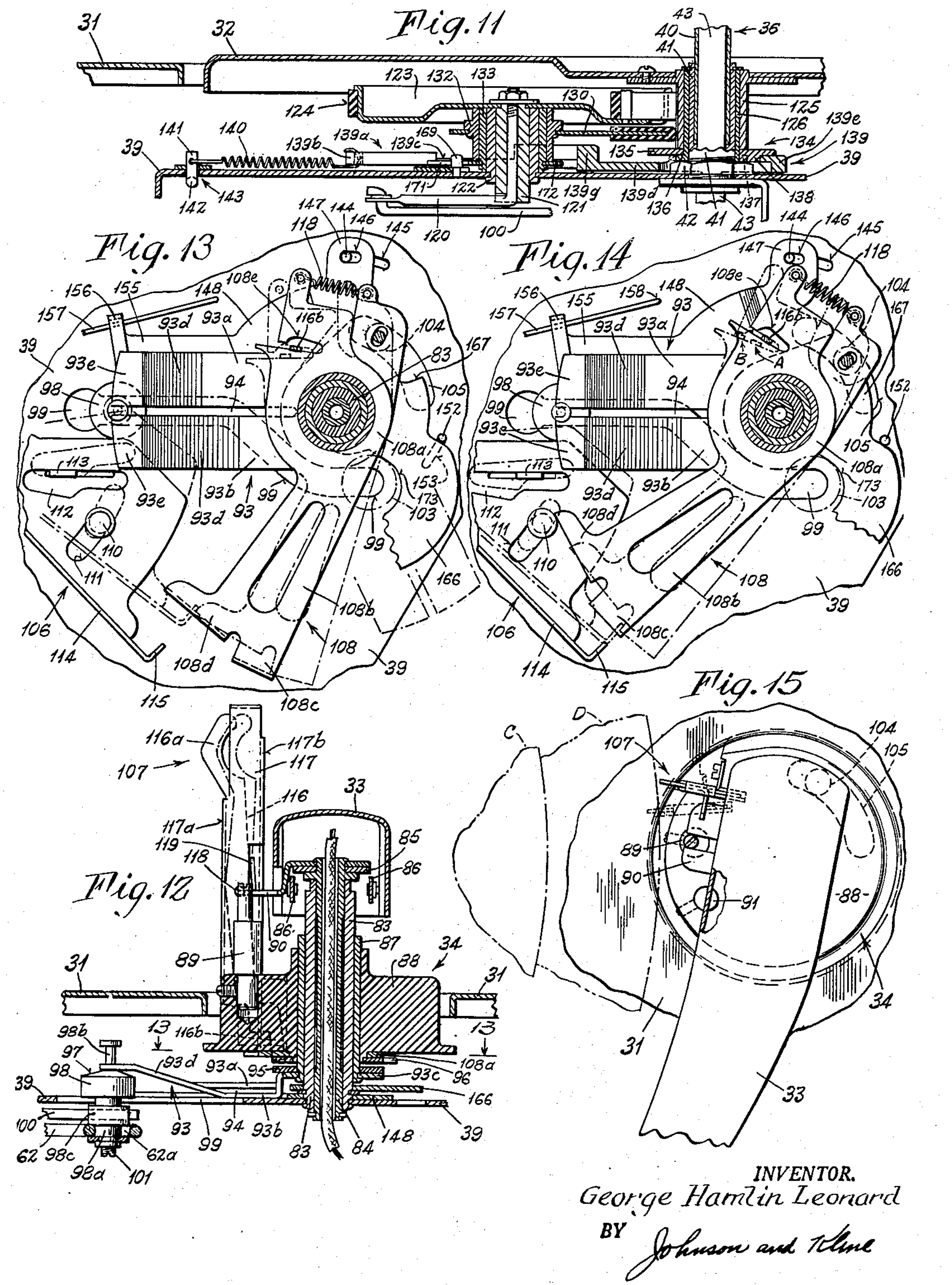
Fig. 11 is a fragmentary vertical section through the main spindle and spindle of the drive wheel for the record change and shut-off mechanisms, taken on line 11—11 of Fig. 7.
Fig. 12 is a fragmentary vertical section through the post or tower for the tone-arm.
Fig. 13 is a fragmentary plan view of the parts located below the tower for the tone-arm, taken on line 13—13 of Fig. 12, the parts being shown in the positions they occupy when the record changer is shut off.
Fig. 14 is a view like Fig. 13 but with the parts in the positions they occupy at the time the playing of a record is started.
Fig. 15 is a fragmentary plan view of the rear portion of the tone-arm and the tower for the tone-arm, the feeler for 12'' records being shown by broken lines in its operative position for engaging the edge portion of a 12'' record, and a 10'' and 12'' records being indicated by dot-and-dash lines.

Referring to Figs. 7, 11 and 12, a base plate 39 is secured below the top panel 31 in spaced relation thereto, all of the mechanism of the record changer with the exception of the starter knob 35 being mounted on the said plate.

In the record changer of this invention and of my copending patent application, a stack of records to be played, comprising 10" records or 12" records or both, is placed on the spindle extending above the turntable to be solely supported thereby, and the starting knob actuated whereupon the record support arms and expandable collar on the spindle, and the tone arm of the record changer are all automatically operated in such a way that the records are dropped one by one on the turntable and played through, the record changer automatically shutting off after the last record has been played.

According to the present invention, means are provided whereby, just prior to shut-off of the mechanism the record support arms 37 are automatically retracted, that is, lowered and nested within the spindle 36 so that the stack of played-through records may be readily and quickly removed from the spindle by just lifting them off, without requiring an extra manual operation to first retract the record-support arms. Also, manually operable means are provided for raising or extending the record support arms, the said means being arranged so that manual operation to drop the arms is impossible without dismantling the parts, and therefore there is prevented inadvertent dropping of a full stack of records from the arms to the turntable at any time.

The spindle structure and actuating means therefore by which this is accomplished is shown in part in Figs. 2 through 6. The spindle 36 comprises a tubular stem 40 pressed into a headed spindle-support bushing 41 secured by a nut 42 to the base plate 39. Slidable in the stem 40 is an arm carrier 43 the upper end of which pivotally mounts the arms 37 by means of pivot pins 37*a*, Fig. 6. The upper portion of the stem 40 is of reduced diameter, and on the shoulder formed by said reduction the expandable collar 38, made of rubber, is seated. Above the collar 38 a sleeve 44 is slidable on the reduced portion of the stem, movement of the sleeve being limited by a cross-pin 45 passing through the sleeve and through longitudinal slots in the stem. A compression spring 46 engages the pin 45 and engages an inturned flange at the top of the stem 40, and a slidable support-arm control pin 47 passes through the spring 46, pin 45, through a slotted friction collar 48 and terminates in a taper engageable with the inner ends of the arms 37. When the arm carrier 43 is in the raised position shown in Fig. 2, the friction collar 48 which has been lifted by the arm carrier is held between the cross pin 45 (which it has raised against the force of the spring 46) and the top of the arm carrier, and raising of the control pin 47 against the friction of the collar 48 allows the arms 37 to drop; also, lowering of the pin 47 through the collar 48 raises the arms.

By this invention a manually operable cap 49 is provided, slidable on the sleeve 44 and at its top engageable with the pin 47. The cap 49 has a lanced nib 50 extending into a slot 51 in the sleeve 44 whereby movement of the cap is limited, and whereby its removal from the sleeve is prevented.

According to this organization it is impossible to manually release or drop the arms 37 and any records carried thereby, since raising of the cap 49 does not raise the pin 47 and the latter therefore will continue to lock the arms in extended position. The arms 37 when in retracted or nested position, however, may be extended by pressing down on the cap 49, thereby pushing the pin 47 down, provided the arm carrier 43 is in the raised position of Fig. 2.

The arm carrier 43 is always at its raised position when the record changer is not passing through a record-change cycle, reject cycle or a shut-off cycle, and therefore at the time that the arms 37 are retracted and the machine is empty, it is merely necessary in order to place a stack of records on the spindle, to press the cap 49 down by hand, causing the arms 37 to be extended to their locked, record-supporting position. Or, if desired, the stack of records may be held in the hands and gently rested on the cap 49, whereby the weight of the stack will depress the cap and extend the arms 37. The stack may then be centralized over the spindle and lowered so as to rest on the arms, the spindle projecting up through the openings of the records.

The weight of the arm carrier 43 alone or with a supported record will tend to continually push it downward, thereby making it gravity-controlled. Actuation of the arm carrier 43 is accomplished by an arm-carrier cam in the form of a plate 52 having a camming edge 52*a* engageable with a large-diameter portion 53 of a stepped roller 54 carried by a shaft 55 at the lower end of the carrier 43, the roller 54 having a small-diameter portion 56 engageable with a laterally offset cam-hook portion 57 located at one end of the camming edge 52*a*.

The arm-carrier cam 52 is pivotally carried by a pivot stud 58 mounted on a depending portion 59 of a cam bracket 60, said bracket having a base portion 61 secured to the base plate 39 by the spindle support bushing 41. The arm carrier cam 52 is operated by a link rod 62 during a record-change or shut-off cycle of the record changer, operation being effected by means described hereinafter. At the beginning and end of such cycles the cam 52 occupies the starting position shown in Fig. 2; at the middle of such cycles the cam occupies the positions shown in Figs. 4 and 5, the cam pivotally moving from the Fig. 2 position in a counterclockwise direction to the positions of Figs. 4 and 5, and returning clockwise to the starting position. Between consecutive cycles and at the beginnings and ends of cycles, the cam 52 maintains the arm-carrier 43 in the raised position of Fig. 2; at the middle of the cycles the arm carrier 43, under the action of gravity, may occupy either of the two lowered positions shown in Figs. 4 and 5 depending on whether the arms 37 carry or do not carry a record respectively, this being brought out in detail later.

Figures 2, 3, 4, 5, 6, 19:
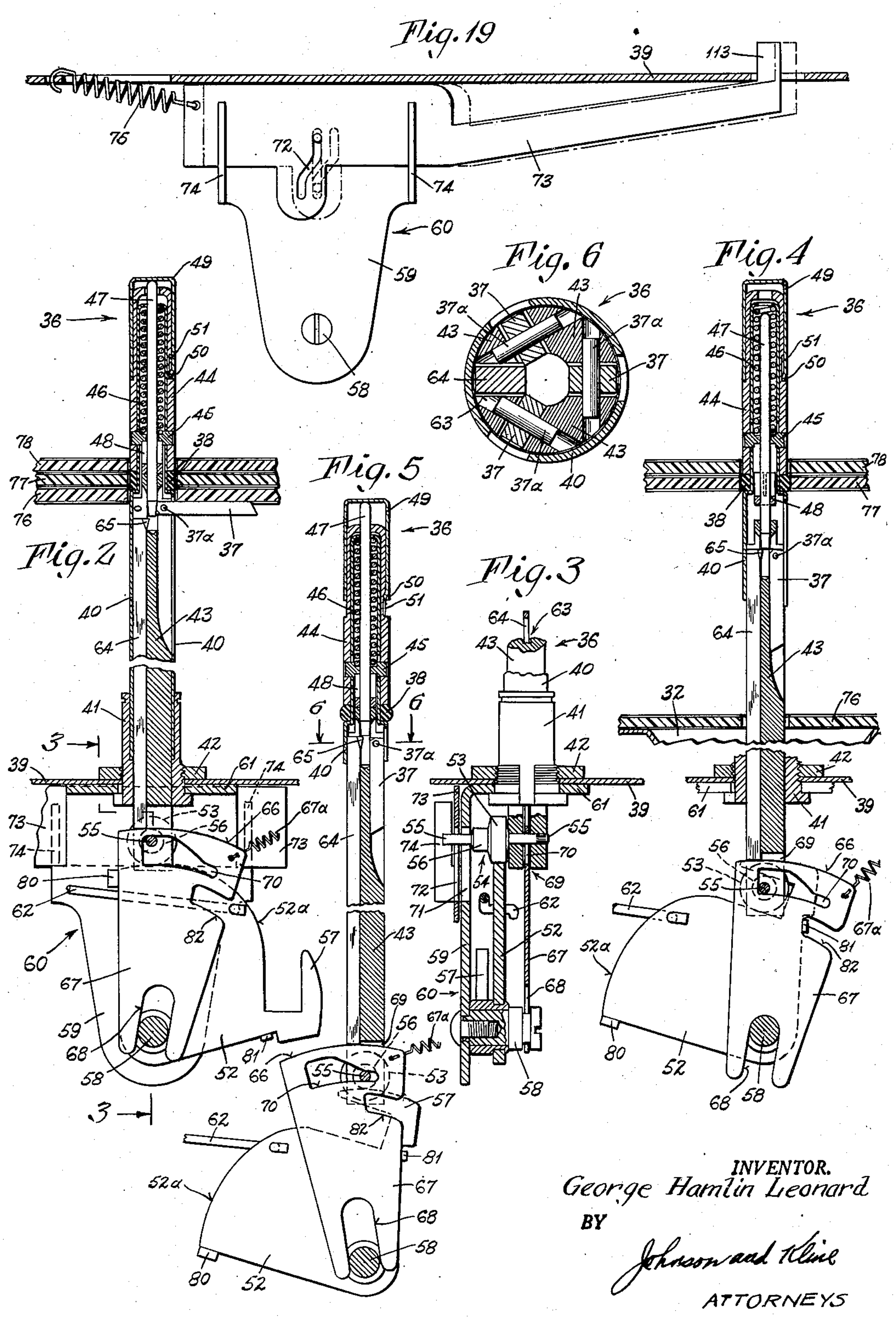
Fig. 2 is a vertical axial section taken through the spindle of the record changer, and showing in elevation the actuating cams for the record-support arms of the spindle, the various parts being in the positions they occupy prior to initiation of a change cycle.
Fig. 3 is a vertical section taken on line 3—3 of Fig. 2.
Fig. 4 is a view like Fig. 2 but showing the parts in the positions they occupy at the middle of a record-change cycle.
Fig. 5 is a view like Figs. 2 and 4 but showing the parts in the positions they occupy at the middle of a shut-off cycle.
Fig. 6 is a transverse or horizontal section taken on line 6—6 of Fig. 5.
Fig. 19 is an elevational view of the shut-off slide of the mechanism, which is responsive to conditions where the record-supporting arms either carry or do not carry a record, the said slide being shown in inoperative or retracted position, and the operative or extended position whereby shut-off is accomplished being shown in dot-and-dash lines.

In order to effect selective automatic actuation of the record support arms 37 in response to the movements of the arm carrier 43 and in response to the presence or absence of a record on the arms, the arm carrier is provided with a longitudinal slot 63, Fig. 3, and a flat push rod 64 is located in the slot, the upper end of the push rod being swaged to provide a lateral extension or finger 65 which is engageable with the bottom tapered end of the arm control pin 47. The lower end of the push rod 64 is engageable with a camming edge 66 of a push rod cam 67 in the form of a flat, generally triangular plate having a bearing slot 68 at its lower end, the said slot receiving the pivot stud 58. The push rod cam 67 is connected by a very weak extension spring 67*a* to the base plate 39; the spring 67*a* is not strong enough to support the weight of the cam 67, but has sufficient pull to normally maintain the cam in a pivotal position shifted to the right, as shown in Fig. 2. The upper edge portion of the push rod cam 67 extends into a slot 69 in the lower end of the arm carrier 43, and the cam has an elongate aperture 70 in its upper portion, through which the shaft 55 of the stepped roller 54 extends. The shaft 55 also extends through a vertical clearance slot 71, Fig. 3, in the bracket 60, and extends through a cam slot 72 in a sensing and shut-off slide 73, Figs. 3 and 19, the slide being in the form of a flat elongate strip slidably carried between the main portion of the bracket 60 and a pair of slide arms 74 formed on the bracket. An extension spring 75 continually urges the slide 73 to the left to retracted position as viewed in Fig. 19, and normally, when the record changer is not passing through a change cycle, the shaft 55 is adjacent the top of the cam slot 72.

In Fig. 2 records 76, 77 and 78 comprising a stack to be played through are supported on the arms 37. The expandable rubber collar 38 is in its normal contracted condition due to the raised arm carrier 43 and friction collar 48 which rests thereon holding the cross pin 45 and sleeve 44 raised, said arm carrier thus taking the pressure of the compression spring 46 which continually urges the sleeve 44 downward. When the cam 52 moves counterclockwise from its starting position, the contour of the camming edge 52 thereof will allow the arm carrier 43 and stack of records on the arms 37 to move downward under the force of gravity and of the spring 46. At first, the arm control pin 47, friction collar 48, sleeve 44, cross pin 45 and cap 49 will all move downward simultaneously with the arm carrier 43, due to the action of the spring 46 in expanding, and this simultaneous movement, with the exception of the records 77 and 78, will continue until the cross pin 45 approaches the bottom ends of the slots in the upper or reduced portion of the stem 40. If no records were on the spindle 36, the cross pin would engage the bottom ends of the slots, and such engagement is shown in Fig. 4; also shown in this figure is the expansion of the rubber collar 38 caused by the spring 46 forcing the sleeve 44 toward the shoulder of the stem 40. When the spindle 36 carries records, the expansion of the collar 38 causes it to grip the second-from-bottom record 77, and the collar 38 thereafter supports the records 77 and 78 until it again contracts at the termination of the cycle; the gripping of a record by the collar 38 prevents the cross pin 45 from bottoming in the slots of the stem 40. After support of the records 77 and 78 by the collar 38, continued movement of the cam 52 results in the arm carrier 43 and record 76 carried by the arms 37 continuing to be controllably lowered, utilizing the action of gravity on the record and arm carrier. The weight of the carrier 43 and record 76 is sufficient, regardless of whether the record diameter is 10″ or 12″, to cause the roller shaft 55 to descend in the cam slot 72 of the slide 73, and to shift the slide from the left position of Fig. 19 to the right position shown by the dot-and-dash outline, against the action of the spring 75. As the cam 52 reaches the position shown in Fig. 4, the roller 54 will have travelled along the camming edge **52*a* to the end thereof, and the small-diameter portion 56 of the roller will be engaged by the inside of the cam hook 57. During the first part of this counterclockwise movement of the cam 52 and lowering of the arm carrier 43, the cam 67 will drop down by its weight against the action of the extension spring 67*a* connected thereto. The push rod 64 will follow the cam 67 and help to overcome any friction between the cam and its pivot 58 which might retard dropping of the cam. The cam 67 will drop until the inner end of the bearing slot 68 thereof engages the pivot stud 58, as in Fig. 4, and thereafter further descending movement of the arm carrier 43, occurring during the latter part of counterclockwise movement of the cam 52, will cause the roller shaft 55 to vertically traverse the aperture 70 in the cam 67, and to engage the lower edge thereof, also as shown in Fig. 4. During said further descending movement of the arm carrier 43, the push rod 64 will be prevented from travelling downward by its engagement with the cam 67, and therefore the upper end of the push rod will force the tapered lower end of the arm-control pin 47 out of engagement with the inner ends of the record-support arms 37, allowing the latter to drop by gravity into their retracted positions wherein they are nested in the spindle 36; upon this occurring the record 76 supported by the arms will drop under the force of gravity to the turntable 32, all as shown in Fig. 4 which depicts the placement of the parts at the middle of the record change cycle. It will be noted that, just prior to the termination of counterclockwise movement of the cam 52 the inside of the hook 57 thereof engages the small-diameter portion 56 of the roller 54, causing the arm-carrier 43 to be pulled down positively for the remainder of said movement, and such positive action insures that the push rod 64 disengage the arm-control pin 47** from the record-support arms.

As the change cycle is completed, the cam 52 returns clockwise to the position of Fig. 2, thereby again raising the arm-carrier 43. The friction of the collar 48 on the arm-control pin 47 holds the latter against shifting upward beyond the position of Fig. 2, and therefore the tapered lower end of the pin again engages the inner ends of the arms 37 and causes these to extend radially from the spindle 36. Subsequent to this extension of the arms 37 the rubber collar 38 is allowed to contract, thereby depositing the records 77 and 78 on the arms. The cam 52 has a lug 80 engageable with the cam 67 to insure that the latter cam occupies its right-most pivotal position as in Fig. 2 when the cam 52 is in its starting position. This cycle of operations is repeated each time another record from the stack on the spindle 36 is to be played.

When the arms 37 no longer carry a record, the cycle occurring after the playing of the last record of the stack is a shut-off cycle, this being determined as follows: When the cam 52 moves counterclockwise, the absence of weight on the arms 37 will result in the arm carrier 43 not dropping, it being not heavy enough to drop by itself because of the friction and restraint created by the pressure of the shut-off slide 73 on the shaft 55, the spring 75 having its tension regulated to effect this. As the arm-carrier cam 52 completes its counterclockwise movement to the position of Fig. 5, the outer edge of the cam hook 57 will engage the small-diameter portion 56 of the stepped roller 54, thereby positively holding the arm-carrier 43 against dropping. The cam 52 is provided with a lug 81 which is engageable with the right-hand side edge of the cam 67, Fig. 5, the said lug forcing the cam 67 to a left-most pivotal position as shown in this figure, and by so doing, the cam 67 is forced upward by virtue of engagement between the shaft 55 and an upper sloping edge of the aperture 70 of the cam. This results in the push rod 64 being raised against the friction of the friction collar 48, the rod moving and forcing the tapered end of the pin 47 out of engagement with the inner ends of the record-support arms 37, dropping the arms, all as shown in Fig. 5. Upon the cam 52 returning clockwise to its starting position of Fig. 2, the spring 67a will pivotally move the cam 67 to the right to starting position from its Fig. 5 position, the push rod 64 again dropping and the arm carrier 43 remaining substantially stationary. By means to be described later, the record changer mechanism is now shut off, by virtue of the shut-off slide 73 not having been shifted from the position shown in Fig. 19.

To prevent pivotal shifting of the cam 67 during the middle of a record change cycle, as indicated in Fig. 4, a clearance slot 82 for the lug 81 is provided in the right hand side edge of the cam.

It will be noted that in a shut-off cycle, the arm carrier 43 does not drop and that the cam 67 is pivotally moved to the left and raised, thereby forcing the push rod 64, arm control pin 47 and cap 49 upward, the pin 47 moving through, and against the friction of, the collar 48. The pin 47 and cap 49 are thereafter held in raised position by the collar 48, until again depressed in the manner already described in connection with placing a stack of records on the spindle 40. Since, as pointed out above, the record-support arms 43 are automatically lowered during the shut-off cycle occurring after a stack of records has been played through, the stack may be easily and quickly removed from the spindle 40 without requiring additional operations such as manually operating a part to lower the record-support arms.

According to this invention an advantageous automatic control mechanism for the tone-arm 33 is provided.

Referring to Fig. 12, the post or tower 34 for the tone-arm 33 comprises a vertical bearing sleeve 83 rigidly secured to and extending upwardly from the base plate 39. Within the sleeve 83 an interior sleeve 84 is rotatably carried, the upper end of which carries a bracket 85 having arms 86 on which the tone arm 33 is pivotally mounted. An outer sleeve 87 is rotatable and axially slidable on the bearing sleeve 83, and rotatably carries a generally annular body member 88, the latter rigidly mounting an upstanding stud 89 the upper end of which extends through the opening of and is slidable in a fork 90 secured to the interior sleeve 84. The body member 88 while axially slidable is thus keyed to the sleeve 84 and bracket 85, and when the body member is turned it will swing the tone-arm 33 with it.

Figures 16, 17, 21, 22, 23, 24, 25:
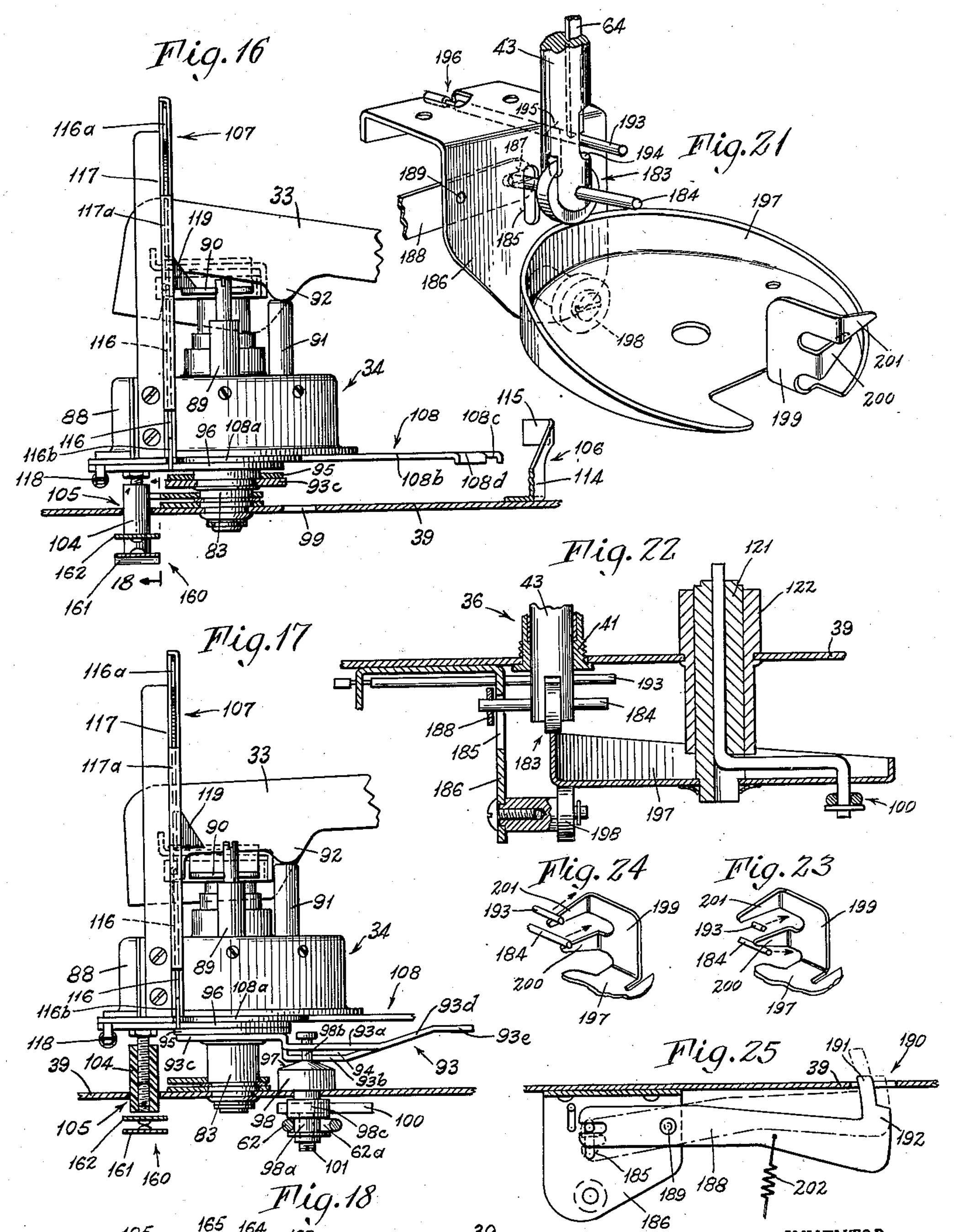
Fig. 16 is a side elevational view of the tone-arm tower and 12'' record feeler carried thereby, the tone-arm being in lowered position.
Fig. 17 is a view like Fig. 16 but with the tone-arm in raised position, the cam for raising the tone-arm being also shown.
Fig. 21 is a perspective view of an alternative form of cam mechanism for actuating the record-supporting arms of the main spindle.
Fig. 22 is a vertical sectional view of the mechanism of Fig. 21.
Fig. 23 is a fragmentary perspective view of actuating fingers and cooperable rods of the mechanism of Figs. 21 and 22, in the relative positions they occupy at the middle of the record change cycle.
Fig. 24 is a view like Fig. 23 but with the parts in the relative positions they occupy at the middle of the shut-off cycle.
Fig. 25 is an elevational view of a shut-off lever for use with the mechanism of Figs. 21 and 22.

As shown in Figs. 16 and 17 the body member 88 has a second upstanding stud 91 the upper end of which is engageable with a depending boss 92 on the tone-arm 33, and accordingly when the body member is raised or lowered the tone-arm is correspondingly pivotally raised or lowered.

For the purpose of controlling the body member 88 during a cycle of operations, a friction drive is provided between said member and the outer sleeve 87, and the latter is cam-and-crank-operated simultaneously with the cams 52 and 67 of the spindle actuating mechanism.

Referring to Figs. 12, 13 and 17, the lower end of the outer sleeve 87 has rigidly secured to it and extending generally laterally therefrom a cam arm 93 having a longitudinal slot 94, the said arm having base portions 93a and 93b connected with a flat annular or washer-like anchorage portion 93c the latter portion surrounding the sleeve 87 and carrying a friction washer 95 which may be advantageously formed of cork. The washer 95 is engageable with a friction plate 96 rigidly secured to the bottom of the body member 88. The cam arm 93 has angularly extending portions 93d located intermediate tip portions 93e and the base portions 93a and 93b, and the said tip and base portions extend normal to the axis of the sleeve 87. The tip portions 93e, angular portions 93d and base portion 93b of the arm 93 are engageable with a conical surface 97 of a cam button 98 which is slidable on the base plate 39, the button having a shank 98a passing through a cam slot or track 99 in the base plate for guidance. The cam button 98 has an upstanding pin or shank 98b which extends through the slot 94 in the cam arm 93 and is engageable with the inner edges of the arm portions 93a, 93b, 93d and 93e which define the slot.

Below the base plate 39 the shank 98a of the cam button 98 carries a collar 98c, and through the said collar and shank a connecting rod or link 100 passes, being rigidly secured by any suitable means such as a screw 101, the link 100 being driven by means to be described later. The shank 98a also passes through and is loosely received by an elongate eye 62a formed by the end of the link rod 62 which is connected to the cam 52 of the spindle control mechanism, thereby providing a lost-motion driving connection between the cam 52 and button 98.

Referring to Figs. 12 and 13, the cam button 98 may be made to travel along the track 99 from a normal retracted position shown in full lines to an advanced mid-cycle position shown in Fig. 13 by a dot-and-dash outline 103, such travel being effected by means of the link 100. Normally the cam arm 93 rests on the base plate 39 as shown in Fig. 12, this being its position when not passing through a cycle. When the cam button 98 starts its advance it engages the angular portions 93d of the cam arm 93, thereby raising the latter and the outer sleeve 87. Shortly after the beginning of such raising movement the friction disk 95 engages the friction plate 96, and thereafter the body member 88 is lifted with the cam arm. This raising or lifting continues until the cam button 98 has traversed the straight portion of the track 99 and is engaging the portion 93b of the cam arm, as shown in Fig. 17, whereupon the cam arm and the body member 88 are fully raised. Fig. 16 illustrates the lowered position of the body member 88, and Fig. 17 the raised position, these figures also showing the lowered and raised pivotal positions of the tone-arm 33.

When the cam button 98 traverses the arcuate portion of the track 99 it will swing the cam arm 93 counterclockwise, as viewed in Figs. 13 and 14, causing the tone-arm 33 to swing outward or away from the spindle 40 due to the friction connection between the cam arm 93 and body member 88, and due to the stud-and-fork connection 89, 90 between the body member and tone-arm. Outward movement of the tone-arm 33 is limited by a pin 104 affixed to and depending from the body member 88 and extending through an arcuate slot 105 in the base plate 39, Figs. 7 and 13 through 17. Upon the tone-arm 33 being stopped by the pin 104, further turning movement of the cam arm 93 will cause slippage between the friction disk 95 and friction plate 96. When the cam button 98 returns from the advanced position 103 to its retracted position it will swing the tone-arm 33 inward and finally lower it again.

According to the present invention, improved means are provided for controlling the extent of inward movement of the tone-arm 33, according to whether a 10″ record or a 12″ record is to be played, or the record changer is to be shut off. This means comprises a selecting stop in the form of a lever 106 which is pivotally mounted on the base plate 39, Figs. 7, 13 and 14, and comprises improved feeler means 107 carried by the body member 88, Figs. 12, 16 and 17, and further comprises a novel index plate 108, constituting a co-operable stop, carried by the body member 88, Figs. 13, 14 and 16, and connection means between said plate and member.

Referring to Fig. 7, the selecting stop lever 106 is roughly of triangular shape, pivoting about a pin 109 and being held close to the base 39 by a pin 110 carried by the base and occupying a slot 111 in the lever. A second slot 112 is provided in the lever 106, one side of said slot being stepped and said slot receiving an upstanding finger 113 which passes through a slot in the base plate 39 and is carried by the end of the shut-off slide 73, Fig. 19. The width of the finger 113 extends longitudinally of the slot 112, and when the slide 73 is in the normal or between cycle position indicated by the full lines of Fig. 19, the finger 113 will occupy the wide portion of the slot 112; when the slide 73 is in the advanced position indicated by the dot-and-dash lines in Fig. 19, the finger 113 thereof will occupy the narrow portion of the slot 112. The stop lever 106 has an upturned stiffening flange 114 along one edge, terminating in an inturned finger 115 which is engageable with the index plate 108, see Figs. 13 and 14.

Referring to Figs. 12, 16 and 17, the index plate 108 is shown as being formed of a flat metal strip having an apertured bearing portion 108*a* which is interposed between the friction plate 96 of the body member 88, the index plate being rotatable with respect to the body member between close limits and being generally movable with the body member, and therefore, with the tone-arm 33.

As shown in Figs. 13 and 14, the index plate 108 has an arm portion 108*b* extending toward the selecting stop lever 106, the said arm portion being bifurcated at its extremity and the two portions 108*c* and 108*d* formed thereby having downturned flanges as shown in Fig. 16, to provide stiffness.

Portions 108*c* and 108*d* of the index plate 108 are selectively engageable with the inturned finger 115 of the stop lever 106. For example, when the lever 106 is turned counterclockwise so that the finger 113 of the shut-off slide 73 engages the widened portion of the slot 112 thereof, as indicated by the dot-and-dash lines in Fig. 13, the stop lever will be so positioned that the finger 115 thereof may engage the side edge or toe of the portion 108*d* of the index plate 108 during clockwise turning of the latter whereby the index plate will be stopped in the position indicated by the dot-and-dash lines.

Use is made of this engagement between the finger 115 and the toe of the portion 108*d* of the index plate to halt the tone-arm 33 in shut-off position, as will be later brought out. It will be noted that the finger 113 of the shut-off slide 73 is in its leftmost position, as viewed in Fig. 3, corresponding with the full line position shown in Fig. 19, which position as has been previously stated, is the shut-off position of the slide 73.

Also, when the stop lever 106 is shifted counterclockwise so that the finger 113 of the shut-off slide 73 engages the narrowed portion of the slot 112 of the lever, as shown by the dot-and-dash outline, the finger 115 of the lever may engage the side of the portion 108*c* of the index plate 108 as the latter turns clockwise, halting the index plate in the position indicated by the dot-and-dash outline.

Engagement of the lever finger 115 with the side of the portion 108*c* of the index plate 108, as indicated by the dot-and-dash outlines in Fig. 1, is utilized to halt the tone-arm 33 in initial position to start on a record carried by the turntable 32, regardless of whether the record is a 10″ record or a 12″ record. In accomplishing this, a selectively operable stop device is provided between the index plate 108 and the body member 88, said stop device being under control of the feeler means 107.

Referring to Figs. 12, 15, 16 and 17, the feeler means 107 comprises a lever 116 extending substantially vertically upward from the body member 88, the said lever being in the form of a flat metal strip carried in a sheet metal casing 117 secured at its lower end to the body member 88 by screws as shown. The lever 116 swings about a pivot 118 carried by the casing 117, and has limited movement as determined by stops in the form of flanges 117*a* and 117*b* of the casing. At its upper end the lever 116 has a generally V-shaped portion 116*a* which projects from the casing 117. The lever 116 extends downwardly through a slot in the body member 88 and at its lower end is shaped to provide an offset 116*b* which extends through a slot 108*e* in the index plate 108 and through a slot in the friction plate 96, Figs. 12, 13, 14, 16 and 17.

Referring to Fig. 14, the offset lower end 116*b* of the feeler lever 116 may occupy either of two edgewisely-shifted positions in the slot 108*e* of the index plate 108. These positions are indicated by broken lines, one being designated A and the other B, and the positions correspond respectively with the full line and broken line positions of the V-shaped top end portion of the feeler lever 116. The slot 108*e* in the index plate 108 is much wider than the thickness of the end 116*b* of the feeler lever, as shown, except at its mouth where the width of the slot is only slightly larger than the thickness of the lever end. Also, the slot 108*e* has one straight side, and normally the lever end 116*b* and the straight side of the slot 108*e* are held in engagement by an extension spring 118 connected between the index plate 108 and the friction plate 96, the latter being rigid with the body member 88.

Referring to Fig. 15, when the tone-arm 33 is in the shut-off position shown, the feeler lever 116 is located beyond the edges of 10″ and 12″ records, indicated respectively by dot-and-dash lines designated C and D. In mid-cycle, when a record is being transferred from the spindle 35 to the turntable 32, the feeler lever 116 is located as shown by the broken lines in Fig. 15, in the path of descent of the edge portion of a 12″ record, this being because the tone-arm 33 occupies a more counterclockwise position than that shown (such more counterclockwise position being determined by the pin 104 engaging the end of the slot 105).

Automatic determination of the different settings of the tone-arm 33 for 10″ and 12″ records is accomplished as follows: Considering Fig. 2, during a record-change cycle the lowermost record 76 will, while being supported on the arms 37, be moved from the position shown to a lower position, due to lowering of the arm-carrier 43 in following the cam 52. Just prior to the cam 52 completing its counterclockwise movement, the arms 37 will be retracted by action of the cam 67, as already explained. However, the lowering of the record 67 while it is on the arms 37 will move the edge portion of the record downward past the V-shaped upper end of the feeler lever 116. While this is occurring the feeler lever will be in the broken line position of Fig. 15, and if the record 67 is a 12″ record, the upper end of the feeler lever 116 will be engaged by the downwardly moving edge portion of the record and will be depressed thereby, causing the lever to occupy the dotted line position of Fig. 12. This will result in the offset end 116b of the feeler lever occupying the position "B" in Fig. 14. After the record 67 has been deposited on the turntable 32 and the tone-arm 33 starts to swing clockwise, the index plate 108 will swing clockwise also, because of its spring connection to the friction plate 96 and body member 88 (and engagement with the end 116b of the feeler lever). The finger 113 of the shut-off lever 73 will be shifted to the position shown in Fig. 14 during the record change cycle, and subsequently the stop lever 106 will be swung counterclockwise (by normally inactive means to be disclosed later) whereupon it will be halted by the finger 113 in the dot-and-dash position shown, and will in turn halt the clockwise-moving index plate 108 in the dot-and-dash position shown. By virtue of the lever end 116b occupying position "B" the body member 88 and tone-arm 33 being driven by the friction disk 95 and plate 96 will be permitted only very little more clockwise movement, until the lever end is brought into engagement with the short slot edge at the mouth of the slot 108e, opposite the long straight slot edge, whereupon the body member and tone-arm 33 will be halted. This halted position is such that the tone-arm stylus is exactly positioned to start on the edge of a 12″ record, and upon the cam button 98 terminating its movement and lowering the member 88 and tone-arm 33, the stylus thereof will follow the playing grooves of the record.

If, however, the record 76 is a 10″ record, its edge portion will not engage the feeler lever 116, and therefore the lower end 116b thereof will remain in the position "A" of Fig. 14. Upon the index plate 108 being halted by the stop lever 106 as indicated by the dot-and-dash lines, the body member 88 and tone-arm 33 driven by the friction disk 95 will be permitted a further predetermined clockwise movement, until the lever end 116b is brought into engagement with the recessed edge of the slot 108e at the wide portion thereof. This of course stretches the spring 118 slightly; it halts the body member 88 and tone-arm 33 in a position, however, such that the tone-arm stylus is exactly initially positioned to start on the edge of a 10″ record. Upon the cam button 98 completing its movement and lowering the body member 88 and tone-arm 33 the stylus will follow the playing grooves of the record. In each of the above instances, upon cessation of turning movement of the cam arm 93 and lowering of the latter and body member 88 and tone-arm 33, the final movement of the cam button 98 will result in its engaging a camming edge 106a of the stop lever 106, and shifting the stop lever clockwise to the normal position shown in Fig. 7. Also, the feeler lever 116 is always automatically returned to its normal extended position shown in Fig. 12 upon the body member 88, tone-arm 33 and feeler lever 116 being lowered at the termination of a cycle, by a reset finger 119, Figs. 12, 16 and 17, which is engageable with the upper surface of the fork 90 upon the lowering of said parts, the upward pressure on the finger 119 causing counterclockwise turning movement of the lever 116, as viewed in Fig. 12.

The movements of the spindle 36 and tone-arm 33 are properly correlated during automatic operation by the link 100, and from the foregoing description it will be understood that, with a stack of records, either 10″ or 12″ or both, supported on the spindle 36, if the cam button 98 is made to repeatedly pass through a cycle by traversing the length of the track 99 from the position of Fig. 7 and returning to said position, the records will be deposited one by one on the turntable 32 and the tone-arm repeatedly placed on the peripheral edge portions of the records in readiness for playing these through. Also, upon the last record being deposited on the turntable, the next cycle will be automatically made a shut-off cycle, and the tone-arm will be lowered in the shut-off position as shown in Fig. 15.

Inasmuch as the engagement between the feeler lever 116 and the 12″ records takes place while the records, in being lowered, are supported on the arms 37, the records will not be tilted by such engagement. When the arms 37 are dropped or released, the record carried thereby will have passed the feeler lever 116 and will therefore not be tilted out of the horizontal but will fall flat on the turntable. The organization of the feeler lever 116 is such, also, that relatively large variations in the diameters of 12″ records may be satisfactorily handled without rendering the mechanism inoperative to discriminate between 10″ and 12″ records.

According to the present invention, novel and improved automatic and manual trip mechanisms are provided, in conjunction with a novel cycle-drive mechanism whereby the spindle 36 and tone-arm 33 may be activated and automatically controlled through driving of the cam button 98.

To accomplish this, improved means are provided, powered from the turntable 32, for automatically driving the cam button 98 through the said cycles, including manually operable means for starting the turntable turning and initiating a cycle, and including means for automatically shutting off the power to the turntable after completion of playing of the last record of a stack and completion of the shut-off cycle attendant thereto.

Accordingly, referring to Figs. 11, 12 and 17, the connecting rod or link 100 which is rigidly secured to the cam button 98 is connected to a drive crank 120 carried by a shaft 121 having a bearing in a tubular post 122 secured to and extending upwardly from the base plate 39. At its upper end the shaft 121 carries a drive wheel 123 having an interrupted rubber-tired periphery 124 for engagement with a cooperable knurled wheel or hub 125 secured to the turntable 32 and having a press-fitted anti-friction liner 126 which bears on the spindle support bushing 41. When engagement occurs between the wheel periphery 124 and the hub 125 while the turntable 32 is turning, the wheel 123 will be driven and the crank 120 will reciprocate the cam button 98 in the track 99.

Figure 8:
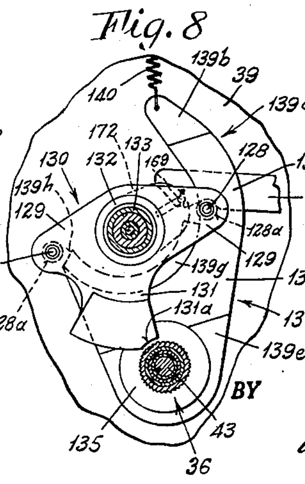
Fig. 8 is a fragmentary plan view showing the parts of the trip mechanism which are located under the drive wheel for the record change and shut-off mechanisms.
Figure 10:
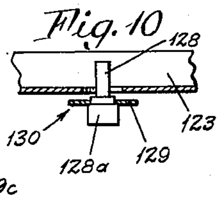
Fig. 10 is a fragmentary section taken on line 10—10 of Fig. 7, showing one of the driving pins carried by the starter plate and engageable with the eccentric follower and rubber-tired drive wheel.

To effect such engagement, the wheel must be started from its normal at-rest position of Fig. 7 wherein the interrupted portion of the wheel periphery 124 is at, and out of engagement with, the hub 125. To accomplish this, referring to Fig. 7, the drive wheel 123 is provided with a pair of apertures 127 in its face, to loosely receive control portions in the form of pins 128 mounted on opposite arms 129 of a segment or starter plate 130. The starter plate 130 has a curved or segment-shaped extension 131 covered by a rubber jacket, Figs. 8 and 11, the said extension and jacket being engageable with the knurled hub 125. The starter plate 130 is carried by a sleeve 132 which has a sliding friction fit with an inner sleeve 133, the latter being freely rotatable on the tubular post 122. The leading corner 131*a* of the starter plate 130 is slightly recessed or cut back, as shown in Fig. 8, to provide an edge contour which generally conforms to the curvature of the knurled hub 125, thereby to enable the latter positively to drivingly engage and pick-up the starter plate when the plate is initially moved or advanced counterclockwise, Fig. 8, the plate thereafter continuing to advance in response to clockwise turning of the hub, until the segment portion 131 leaves or disengages the hub.

The advance of the starter plate 130 causes the pins 128 thereof to engage and drive the drive wheel 123, the latter thereby having its turning movement continued through a complete revolution by engagement of the periphery 124 with the knurled hub 125 of the turntable 32. Upon the drive wheel 123 turning through a complete revolution a complete cycle of operations of the record player spindle and tone-arm 33 is effected, such cycle being either a record change cycle or a shut-off cycle as determined by the presence or absence of weight on the record support arms 37.

The starter plate 130 may be actuated either by manual or automatic means, the manual means being actuated when a stack of records is to be started, and the automatic means being actuated upon completion of playing of each record.

To accomplish this a novel mechanism is provided, including what is herein termed a velocity trip device, since the said device is responsive to the velocity of inward swinging movement of the tone-arm 33.

Figure 9:
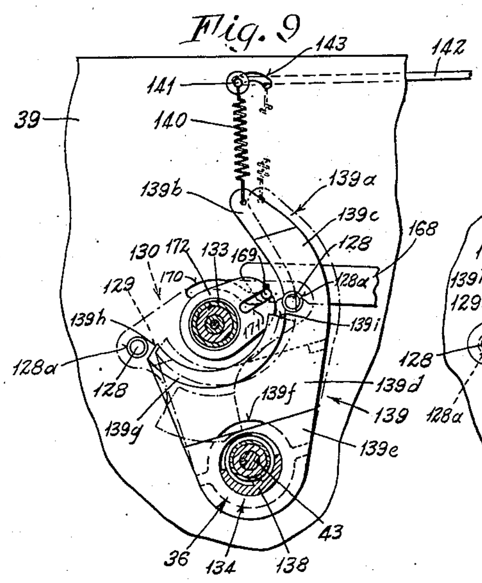
Fig. 9 is a view like Fig. 8 but with the starter segment of the trip mechanism removed and shown in dot-and-dash outline, and further showing in dot-and-dash outline a shifted position of the arcuate eccentric follower which either shifts or checks the starter segment.

Referring to Figs. 9 and 11, an eccentric 134 is mounted on the knurled hub 125 to turn therewith, the eccentric comprising a disk 135 carried by the press-fitted anti-friction liner 126 of the hub, the said liner having an end flange 136 engaging the underside of the eccentric disk 135, Fig. 11, to retain the disk in place. The flange 136 of the liner 126 has a notch for receiving a projection 137 on the eccentric disk 135 whereby the disk is keyed against relative movement with respect to the liner and the hub 125. The eccentric disk 135 also has a crescent shaped eccentric portion 138 extended downwardly therefrom, as shown in Fig. 11, the said portion extending into an aperture in an eccentric follower plate 139 which is slidably carried by the base plate 39 of the record changer. As clearly shown in Fig. 11 the eccentric portion 138 of the eccentric plate 135 occupies one part of the aperture in the eccentric follower plate 139, and the flange 136 of the anti-friction liner 126 occupies another part of the said aperture, said flange and eccentric portion providing an eccentric bearing for the aperture and being so arranged as to prevent lost motion from occurring. As will be noted, the support bushing 41 which passes through the anti-friction liner 126 also extends through the aperture in the eccentric follower plate 139.

Referring to Figs. 9 and 11, the eccentric follower plate 139 has portions of different thickness and has a hook-like extension 139*a* having an arcuate shape. The extremity 139*b* of the hook-like extension is relatively thick as shown in Fig. 11, whereas the remainder 139*c* of the extension is comparatively thin. The body portion 139*d* of the eccentric follower plate is of the same thickness as the extension portion 139*c*, and said body portion connects with a thicker portion 139*e* which bears on the eccentric 134. A clearance aperture 139*f* is provided in the follower plate 139 to enable it to clear the nut 42 on the support bushing 41. The eccentric follower plate 139 also has an arcuate shaped raised portion 139*g* having abuttable end surfaces 139*h* and 139*i* which are adapted for engagement under certain circumstances with depending projections 128*a* on the pins 128 which are carried by the starter plate 130. As shown in Fig. 8 the eccentric follower plate 139 and arcuate raised portion 139*g* thereof extend under the starter plate 130, and the hook-like extension 139*a* of the eccentric follower plate extends past the crank shaft 121 which carries the drive wheel 123.

The eccentric follower plate 139 is held in either of two different zones of movement by an extension spring 140 secured to the extension 139*a* and to one end 141 of a manual trip link 142, the said end being bent at right angles to the link and extending through an arcuate shaped slot 143 in the base plate 39, Fig. 9. The other end 144 of the link 142 is also bent at an angle and extends through a second arcuate shaped slot 145 in the base plate 39, the said end 144 passing through an arcuate slot 146 in an arm 147 of a manual trip lever 148 which is rotatably mounted on the vertical bearing sleeve 83, Figs. 12 and 13, and slidably rests on the base plate 39. As shown in Fig. 12 the portion 93*a* of the cam arm 93 is raised above the base plate 39 to provide clearance for the lever 148.

Referring to Figs. 7 and 9 it will be seen that turning movement of the manual trip lever 148 is limited by the link end 144 and the slots 145 and 146; counterclockwise movement of the lever 148 to the position shown in Fig. 7 will cause the spring 140 and eccentric follower plate 139 to occupy the position shown in Figs. 7 and 9. Clockwise movement of the lever 148 will shift the spring 140 and eccentric follower plate 139 to the broken line position shown in Fig. 9.

Actuation of the manual trip lever 148 from the position shown in Fig. 7 in a clockwise direction is effected by means of a link 149 connected to the starting knob 35, the said link passing through slots 150 and 151 in the top panel 31 and base plate 39 respectively. The starting knob link 149 has an upturned end 152 extending through a second slot 153 in the base plate 39, the said end being engageable with an arm 154 of the manual trip lever 148. When the starting knob 35 is turned clockwise as viewed in Fig. 7 it shifts the link 149 downward causing the end 152 thereof to engage the lever arm 154 and turning the manual trip lever 148 clockwise. This shifts the trip link 142 and spring 140 to the right as viewed in Figs. 7 and 9 and causes the eccentric follower plate 139 to occupy a zone of movement as indicated in the broken lines in Fig. 9. With the turntable 32 continuously rotating, the eccentric 134 will be continuously turning, thereby causing the follower plate 139 to oscillate.

When the follower plate is in the broken line position in Fig. 9 the end surface 139i of the arcuate raised portion 139g of the follower plate will engage the adjacent portion 128a of the pin 128 and will nudge the pin to cause a slight counterclockwise rotation of the starter plate 130. This will cause the segment shaped portion 131 thereof to engage the knurled hub 135 which is rotating with the turntable 132 and will initiate movement of the starter plate and of the drive wheel 123 and carry the drive wheel through a complete revolution thus causing a cycle of operations of the record changer. The manual trip lever 148 has another arm 155, provided at its extremity with a hook 156 through which a wire spring 157 extends. The spring 157 is herein termed a stop lever charge spring since it actuates the stop lever 106 to automatically shift the latter to its operative positions. To accomplish this, one end of the spring 157 is pivotally anchored in an aperture 158 in the base plate 39 and the other end passes through an aperture in an upturned finger 159 in the lever 106. With the parts in the positions shown in Fig. 7 the manual trip lever 148 is not exerting pressure on the charging spring 157. When the starting knob 35 is actuated clockwise from the off position shown in Fig. 7, causing the manual trip lever 148 to swing clockwise, the hook 156 of the latter will move away from the stop lever charging spring 157. As the change cycle progresses the cam button 98 will travel along its track 99 and upon reaching the extremity thereof will engage the arm 154 of the trip lever 148 and will move the trip lever counterclockwise past the position of Fig. 7 by the amount allowed by the slot 146 in the lever. This will establish a pressure by the lever, on the charging spring 157, causing the latter to swing the stop lever 106 in a counterclockwise direction to either of its operative positions as determined by the position of the finger 113 of the shut-off slide 73. Upon the cam button 98 completing its cycle, during which the stop lever 106 halts the tone-arm 103 in its proper position for playing a record or for shut-off, the cam button will engage the stop lever and return it to the position shown in Fig. 7 as already explained. All this is in response to actuation of the starting knob 35. If a stack of records is carried by the spindle 36 the lowermost record will be dropped on the turntable and will be played through, presuming of course that the turntable 32 is turning by virtue of the electrically-powered drive "DR" (Fig. 7) for the turntable being energized. Such energization is effected by a semi-automatic control device including a blade switch 160, Figs. 7, 16, 17 and 18, the said switch having blades 161 and 162 which are normally in engagement with each other as shown in Fig. 17. When however the tone-arm 33 is at rest in the shut-off position shown in Figs. 15 and 16, the pin 104 carried by the body member 88 of the tone-arm tower depresses the switch blade 161 and separates it from the blade 162. To cause engagement of the blades when the starting knob 35 is actuated, the arm 147 of the trip lever 148 is provided with a camming portion 163, Figs. 7 and 18, which portion is engageable with an anti-friction ball 164 supported on the upper end of an insulating stud 165 mounted on the switch blade 162. Clockwise turning of the manual trip lever 148 causes the switch blade 162 to be depressed and to engage the switch blade 161, thereby closing the circuit of the motor drive DR for the turntable and causing the turntable to rotate.

Upon the record changer mechanism being started by actuation of the starting knob 35 in the manner explained above, the lowermost record of a stack will be dropped on the turntable and played through. Upon this occurring a record change cycle will be automatically instituted, as follows, by the velocity trip mechanism already mentioned, which mechanism includes the eccentric 134 and eccentric follower plate 139. The velocity trip mechanism also includes a velocity trip lever 166, Figs. 7, 12, 13 and 14, which is rotatably carried by the vertical bearing sleeve 83 of the tone-arm tower 34. Referring to Fig. 7 the velocity trip lever 166 has a shoulder 167 which is engageable by the pin 104 of the body member 88 when the latter and the tone-arm 33 are swung clockwise, as the pin approaches the right hand end of the slot 105 in the base plate 39. The trip lever 166 is connected to one end of a cross link 168 the other end of which carries a pin 169 extending through an S-shaped slot 170 in the base plate 39, on the inner sleeve 133 carried by the post 122 in which the crank shaft 121 journals, Fig. 11. As already stated above, the inner sleeve 133 has a frictional sliding fit with the sleeve 132 which carries the starter plate 130. Thus, when the velocity trip lever 166 is turned clockwise in response to the tone-arm 33 reaching the inside end of a record, the velocity trip cross link 168, Fig. 7, will be shifted to the left and the pin 169 thereof will traverse the groove 170 causing counterclockwise turning of the fork member 172. Due to the friction existing between the sleeves 132 and 133 this will result in the starter plate 130 being urged in a counterclockwise direction. If the movement of the cross link 168 and the pin is relatively slow, as occurs during playing of a record, the movement of the starter plate 130 will be slow and the pin 128 thereof adjacent the end surface 139h of the eccentric follower plate 139 will be repeatedly nudged by the said end surface so that the starter plate will not be allowed to turn but will be held substantially in the position shown in Figs. 8 and 9 regardless of the turning movement of the fork member 172. If, however, the cross link 168 and pin 169 should move rapidly to the left, as would be caused by the tone-arm stylus following either the eccentric or the large-pitch spiral groove at the inner end of a record, a rapid and relatively great rotation of the fork member 172 in counterclockwise direction would result, and this will cause the starter plate 130 to have a rapid and relatively great movement, and cause the leading corner 131a of the plate to engage the knurled wheel 125 whereby the plate will be picked up and driven by the wheel. This occurs because the pin 128 adjacent the end surface 139h is rapidly moved to an advanced position where the corner 131a of the plate engages the wheel 125 before the end surface 139h in its opposing movement will have travelled sufficiently to nudge back and return the pin 128, as it normally does during the playing of a record. Therefore since the starter plate 130 has now become engaged with the knurled hub 125 a change cycle will be initiated, the pin 128 of the starter plate now driving the end surface 139h out of the way, and the latter yielding by virtue of the yield of the spring 140. The portion 128a of the pin 128 travels on the outside of the raised crescent portion 139g of the eccentric follower plate 139 during the first part of the change cycle.

I have found that such rapid movement of the cross link 168 is readily caused by the inwardly directed portion of the eccentric groove at the inner end of a record, and therefore when a record has been played through a change cycle will automatically take place upon the stylus entering the said eccentric groove. Also a spiral groove of large pitch, such as is commonly found on many records, will impart such speed or velocity to the cross link 168 as to cause a change cycle to be initiated as described above. Upon such change cycle occurring, the next record of the stack will be deposited on the turntable 32 and the tone-arm will start playing this next record.

It should be noted that midway during the change cycle, the cam button 98 will engage a curved neck portion 173 of the velocity trip lever 166 and will return the lever and velocity trip cross link 168 to the normal position shown in Fig. 7.

Figure 18:
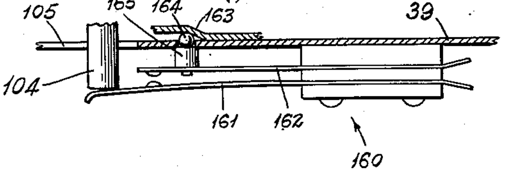
Fig. 18 is a fragmentary elevational view of the switch mechanism of the record changer, taken on the line 18 of Fig. 16.

By virtue of the above organization, each record of a stack will be played through consecutively and automatically once the starting knob 35 has been actuated, and upon the last record being played through, the tone-arm 33 will be deposited in the shut-off position and the pin 104 of the body member 88 will assume the position shown in Figs. 7, 16 and 18 wherein it separates the switch blade 161 from the switch blade 162 and deenergizes the motive power for the turntable 32. Such separation is possible due to the fact that the manual trip lever 148, after the initial starting of the playing of a stack of records, is returned to the normal position of Fig. 7 wherein it does not depress the switch blade 162 through the ball 164 and stud 165. Also, after the starting knob 35 has been actuated it is returned during the first cycle of operations by virtue of the cam button 98 returning the manual trip lever 148 and velocity trip lever 166 to their normal positions of Fig. 7. Such return is indicated in Figs. 13 and 14 by the broken-line showing of the cam button 98.

If at any time while playing a stack of records it should be desired to halt the playing of a record on the turntable and start the playing of the next or succeeding record, this may be accomplished by initiating what I term a reject cycle, by actuating the starting knob 35. Such actuation shifts the eccentric follower 139 to the dotted position of Fig. 9, whereupon the surface 139i thereof drives the adjacent pin portion 128a so as to turn the starter plate 130 counterclockwise into engagement with the knurled wheel 125.

By the provision of the friction connection between the cam arm 93 and the tone-arm tower 88, the tone-arm 33 may be made to lift and swing out of the way prior to the spindle 36 being operated, thereby insuring that the space below the lowermost record is clear before the said record is dropped on the turntable 32, this being effected by providing for an arc of movement of the cam arm 93 which is greater than that needed to cause the tone-arm 33 to be halted by the stop 104.

The velocity trip mechanism of this invention as described above cannot be damaged if, when the record changer is part way through a cycle, the turntable should be inadvertently turned, as might occur during servicing or adjustment for example. Moreover, the trip mechanism is operative for records having either eccentric or spiral grooves at the inner ends of the playing grooves, and does not require critical adjustment. The force required to swing the velocity trip lever 166, link 168, fork member 172 and starter plate 130 is relatively small, so that this may be readily accomplished by the pin 104 and tone-arm 33, thereby enabling the tone-arm to operate with extremely light needle pressure on a record, without rendering the record-change and shut-off mechanism inoperative.

The improved record changer mechanism as described above operates with a minimum of noise and wear, and is extremely trouble-free and reliable in operation.

A modified form of spindle for the record changer of this invention is shown in Fig. 20, wherein parts similar to those already described have been given the same characters as the previously mentioned parts. In this modified form of spindle the record support arms 37 may be either raised or lowered by a manually operable means, the said means being so arranged however that its inadvertent operation is extremely unlikely, especially when the spindle is supporting a stack of records, thereby preventing a stack from being dropped all at once on the turntable.

As shown, the arm control pin 174 for the arms 37 has secured to its upper end a finger piece 175 the ends of which extend through slots 176 in a tubular stem 177 and also extend through slots 178 in an outer sleeve 179. The sleeve 179 has an inturned flange at its top and is slidable on the reduced portion of the stem 177, and may be urged downwardly by a screw 180 seated in the flange of the sleeve and threaded into a collar 181 which is engaged by the compression spring 46.

The exposed ends of the finger piece 175 are knurled, and when the finger piece is grasped and moved downward the lower end of the arm control pin 174 will engage and raise the record support arms 37. If the finger piece 175 is raised the arm control pin 174 will disengage the arms 37 and allow them to drop. A friction collar 48a is frictionally carried by the pin 174 and has a clearance slot 48b for the finger piece 175, the collar extending upward past the piece 175 and engaging the threaded collar 181 to raise the collar and compress the spring 46 when the arm carrier 43 is raised, thereby enabling the expansible rubber collar 38 to contract to its normal small diameter shape. To accomplish this action, the friction collar has four depending prongs 48c which frictionally grip the pin 174 and are engageable with the top of the arm carrier 43. Inwardly bent tabs 182 are provided on the sleeve 179 to align the slots 178 and 176 of the sleeve 179 and of the stem 177 respectively, and prevent binding of the finger piece 175.

Automatic actuation of the arm control pin 174 is effected by the push rod 64 as previously explained. In addition, the pin 174 may be actuated manually. However, when a stack of records is supported on the arms 37 the finger piece 175 will be enclosed by the records and not accessible for actuation, and therefore it will be impossible to inadvertently drop a stack of records on the turntable. Adjustment of the gap between the collar 38 and the extended arms 37 may be accomplished by forcing the sleeve 179 down and then turning the screw 180.

A modified form of cam operator for the spindle 36 of the record changer is shown in Figs. 21 through 25. In Fig. 21 the lower end of the arm carrier 43 is shown, the said end being bifurcated and mounting a roller 183 on a shaft 184 which latter passes through a slot 185 in a bracket 186 adapted for securement to the underside of the base plate 139. The shaft 184 also passes through a slot 187 in a lever 188 pivoting about a pin 189 carried by the bracket 186.

Referring to Fig. 25, the lever 188 which takes the place of the shut-off slide 73 previously described, and has an upstanding finger 190 with a narrow extremity portion 191 and a broader base portion 192 for engagement with the stop lever 106.

A lever 193 formed of wire extends through a notch 194 in the arm carrier 43, and through a slot 195 in the bracket 186, the lever having a pivotal pin-and-slot connection with the bracket 196.

The crank shaft 121 carries a circular cam 197 for engagement with the roller 183, and an idler roller 198 is mounted on the bracket 186 for engagement with the undersurface of the cam 197.

To actuate the shaft 184 and lever 193 the cam 197 has an upturned tab 199 which carries a pair of tapered fingers 200 and 201.

When the arm carrier 43 is loaded with the weight of a record, the roller 183 will be maintained in engagement with the cam 197 as the latter turns, and the fingers 200 and 201 will pass by the shaft 184 and lever 193 in the manner shown in Fig. 23. With the parts in the position of Fig. 23 the shaft 184 will be almost in fully lowered position, and the lever 188 almost in the dot-and-dash position of Fig. 25, and the finger 200 will force the shaft 184 the remainder of the distance downward and lock the finger 190 of the shut-off lever 188 up so as to position the stop lever 106 for starting the tone-arm 33 on the next record. The arms 37 are tripped or lowered by the finger piece 175 and pin 174 (Fig. 20) being held in a position wherein the finger piece rests on the bottoms of the slots 176 while the arm carrier 43 being lowered and finally forced all the way down by the finger 200 engaging the shaft 184.

When the arm carrier 43 is not loaded by a record, as is the case after the last record of a stack has been played, upon rotation of the cam 197 the arm carrier will not fully descend and maintain the roller in engagement with the cam but instead will be held in a somewhat raised position by a balance spring 202 attached to the shut-off lever 188. If desired the spring 202 may be omitted by weighting the finger-carrying end of the lever 188 to balance the arm carrier 43. For this condition, the tapered finger 201 will engage the lever 193 in the manner shown in Fig. 24, and the lever 193 will be raised or cammed upward thereby while the arm carrier 43 is prevented from being raised by the spring 46 (Fig. 20), thereby resulting in raising of the push rod 64 and causing the record support arms 37 of the spindle to be dropped.

Variations and modifications may be made within the scope of this invention and portions of the improvements may be used without others.

I claim:

1. In an automatic record changer, a trip device for initiating a record change cycle after the playing through of a record, comprising an eccentric; means for rotating the eccentric; a follower reciprocably driven by the eccentric and having an abuttable interfering surface reciprocating between retracted and advanced positions at moderate speed; a wheel rotating concurrently with the eccentric; and a rotatable segment engageable with the wheel to be driven thereby through part of a revolution; means for moving said segment towards said wheel at differing rates with a yielding force, said segment having a control portion engageable with the interfering surface of the eccentric follower when the segment is moved toward the wheel and the interfering surface is advanced, to prevent movement of the segment into wheel engaging position, and said segment when slowly moved by the yielding force toward the wheel being repeatedly nudged away therefrom by said interfering surface during its advancing movement, the segment when rapidly moved by said yieldable force toward the wheel engaging the latter by virtue of said control portion more rapidly advancing toward the wheel than the moderate speed of advancement of the interfering surface of the eccentric follower, thereby enabling the wheel to pick up the segment between successive advancements of the interfering surface and to drive the segment through part of a revolution.

2. In an automatic record changer, a trip device for initiating a record change cycle after the playing through of a record, comprising an eccentric; means for rotating the eccentric; a follower driven by the eccentric and having an abuttable surface traveling between retracted and advanced positions; a wheel rotating concurrently with the eccentric; a rotatable segment engageable with the wheel to be driven thereby through part of a revolution, said segment having a control portion engageable with the abuttable surface of the eccentric follower when the segment is moved toward the wheel, and said segment when slowly moved by a yielding force toward the wheel being repeatedly nudged away therefrom by said abuttable surface, the segment when rapidly moved by said yieldable force toward the wheel engaging the latter by virtue of said control portion by-passing the abuttable surface of the eccentric follower, thereby enabling the wheel to pick up the segment and drive it through part of a revolution; means for automatically rapidly moving the segment by a yieldable force toward the wheel after a record has been played through; and means under manual control, for driving the segment toward the wheel independently of said immediately preceding means.

3. In an automatic record changer, a trip device for initiating a record-change cycle, comprising an eccentric; means for rotating the eccentric; a follower driven by the eccentric with a uniform reciprocating motion and having an abuttable driving surface reciprocating between retracted and advanced positions; a wheel rotating concurrently with the eccentric; a rotatable segment engageable with the wheel to be driven thereby through part of a revolution, said segment having a control portion engageable with the driving surface of the eccentric follower, said follower being normally positioned to maintain the reciprocating driving surface thereof out of engagement with the control portion of the segment during its advancing movement; and means including a manually operable member for shifting the eccentric follower to another position wherein the driving surface thereof has a different locus of reciprocation in which it engages and drives the control portion of the segment during the advancing movement of the surface to move the segment into engagement with said rotating wheel, thereby to enable the wheel to pick up the segment and drive it through part of a revolution.

4. In an automatic record changer, a trip device for initiating a playing cycle, comprising an eccentric; means for rotating the eccentric; a follower driven by the eccentric with a uniform reciprocating motion and having an abuttable driving surface reciprocating between retracted and advanced positions; a wheel; means for rotating the wheel concurrently with the eccentric; a rotatable segment engageable with the wheel to be driven thereby through part of a revolution, said segment having a control portion engageable with the driving surface of the eccentric follower, said follower being normally positioned to maintain the reciprocating driving surface thereof out of engagement with the control portion of the segment during its advancing movement; means including a manually operable member movable between on and off positions and a spring connected to the eccentric follower and operable by said member when moved to on position, for shifting the follower to another position wherein the driving surface thereof has a different locus of reciprocation in which it engages and drives the control portion of the segment during the advancing movement of the surface to move the segment into engagement with said rotating wheel, thereby to enable the wheel to pick up the segment and drive it through part of a revolution; and means powered from said wheel for automatically shifting the manually operable member from on to off position after the wheel has picked up the said segment.

5. In an automatic record changer, a trip device for initiating a change cycle, comprising an eccentric; means for rotating the eccentric; a follower driven by the eccentric and having a pair of abuttable surfaces traveling between retracted and advanced positions, said follower being movable between normal and shifted positions; a wheel rotating concurrently with the eccentric; a rotatable segment engageable with the wheel to be driven thereby through part of a revolution, said segment having a pair of control portions engageable respectively with the abuttable surfaces of the eccentric follower, one control portion and one abuttable surface engaging each other when the segment is moved toward the wheel and the eccentric follower is in normal position, and said segment when slowly moved by a yielding force toward the wheel being repeatedly nudged away therefrom by the said one abuttable surface, the segment when rapidly moved by said yieldable force toward the wheel engaging the latter by virtue of said control portion more rapidly advancing toward the one abuttable surface of the eccentric follower, thereby enabling the wheel to pick up the segment and drive it through part of a revolution; and means including a manually operable member for shifting the eccentric follower from its normal position to a position wherein the other abuttable surface thereof engages and drives the other control portion of the segment, thereby to move the latter into engagement with the wheel to be driven thereby through part of a revolution.

6. In an automatic record changer, a trip device for initiating a change cycle, comprising an eccentric; means for rotating the eccentric; a follower driven by the eccentric and having a pair of abuttable surfaces traveling between retracted and advanced positions said follower being movable between normal and shifted positions; a wheel rotating concurrently with the eccentric; a rotatable segment engageable with the wheel to be driven thereby through part of a revolution, said segment having a pair of control portions engageable respectively with the abuttable surfaces of the eccentric follower, one control portion and one abuttable surface engaging each other when the segment is moved toward the wheel and the eccentric follower is in normal position, and said segment when slowly moved by a yielding force toward the wheel being repeatedly nudged away therefrom by the said one abuttable surface, the segment when rapidly moved by said yieldable force toward the wheel engaging the latter by virtue of said control portion more rapidly advancing toward the one abuttable surface of the eccentric follower, thereby enabling the wheel to pick up the segment and drive it through part of a revolution; means including a manually operable member for shifting the eccentric follower from its normal position to a position wherein the other abuttable surface thereof engages and drives the other control portion of the segment, thereby to move the latter into engagement with the wheel so as to be driven thereby through part of a revolution; and means for automatically returning the eccentric follower from shifted to normal position after the segment has been driven by the wheel.

7. In an automatic record changer having a tone arm carrying a playing needle and designed to be moved in response to the feeding of the needle in a record groove, a trip device for initiating a record change cycle after the playing through of a record, comprising an eccentric; means for rotating the eccentric; a follower driven by the eccentric and having an abuttable surface traveling between retracted and advanced positions; a wheel rotating concurrently with the eccentric; a rotatable segment engageable with the wheel to be driven thereby through part of a revolution, said segment having a control portion engageable with the abuttable surface of the eccentric follower when the segment is moved toward the wheel, and said segment when slowly moved by a yielding force toward the wheel being repeatedly nudged away therefrom by said abuttable surface, the segment when rapidly moved by said yieldable force toward the wheel engaging the latter by virtue of said control portion by-passing the abuttable surface of the eccentric follower, thereby enabling the wheel to pick up the segment and drive it through part of a revolution; and means including a yielding connection for automatically moving said segment towards said wheel at speeds substantially proportional to the speeds at which the tone arm is moved.

GEORGE HAMLIN LEONARD.

REFERENCES CITED

The following references are of record in the file of this patent:

UNITED STATES PATENTS

| Number | Name | Date |
|---|---|---|
| 1,926,580 | Clark | Sept. 12, 1933 |
| 2,090,746 | Compare | Aug. 24, 1937 |
| 2,211,423 | Hokanson | Aug. 13, 1940 |
| 2,287,098 | Habegger | June 23, 1942 |
| 2,295,092 | Offen | Sept. 8, 1942 |
| 2,298,988 | Todd | Oct. 13, 1942 |
| 2,307,030 | Erwood | Jan. 5, 1943 |
| 2,323,472 | Johnson et al. | July 6, 1943 |
| 2,330,293 | Knox | Sept. 28, 1943 |
| 2,376,741 | Weaver | May 22, 1945 |